United States Patent
Matsuo et al.

(10) Patent No.: US 6,650,841 B1
(45) Date of Patent: *Nov. 18, 2003

(54) OPTICAL SUBSCRIBER LINE TERMINAL UNIT AND A STATE TRANSITION CONTROL METHOD

(75) Inventors: Tamotsu Matsuo, Osaka (JP); Kenji Miura, Osaka (JP); Takashi Monzawa, Osaka (JP); Yoshimi Toyoda, Osaka (JP); Jun Asato, Osaka (JP); Toshinori Koyanagi, Kawasaki (JP); Setsuo Abiru, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,304

(22) Filed: Nov. 12, 1999

(30) Foreign Application Priority Data

Apr. 15, 1999 (JP) .............................................. 11-107617

(51) Int. Cl.⁷ ................................................ H04B 10/00
(52) U.S. Cl. ....................................... 398/100; 370/255
(58) Field of Search ......................... 359/125; 370/255, 370/433, 437, 450, 451, 452, 453, 454, 455, 456, 457

(56) References Cited

U.S. PATENT DOCUMENTS

| 5,309,501 A | * | 5/1994 | Kozik et al. .................. 340/5.8 |
| 5,325,360 A | * | 6/1994 | Friedrich ..................... 370/453 |
| 5,822,398 A | * | 10/1998 | Hall et al. ................... 370/514 |
| 6,369,705 B1 | * | 4/2002 | Kennedy .................... 340/506 |

FOREIGN PATENT DOCUMENTS

JP 63105539 5/1988

* cited by examiner

*Primary Examiner*—Jason Chan
*Assistant Examiner*—Agustin Bello
(74) *Attorney, Agent, or Firm*—Katten Muchin Zavis Rosenman (57) ABSTRACT

An optical subscriber line terminal unit and a state transition control method are provided which are capable of stabilizing operation. State information storing means, which is a nonvolatile memory, stores state information about the unit. Startup preparatory state shifting means causes a shift to a startup preparatory state at startup. Flag setting means sets an emergency stop state flag during the period of the startup preparatory state if it is judged based on the state information that a state before the startup is an emergency stop state. State transition control means causes a shift from the startup preparatory state to the emergency stop state if the emergency stop state flag is set, and causes a shift from the startup preparatory state to an initial state if the emergency stop state flag is not set.

4 Claims, 8 Drawing Sheets

OPTICAL SUBSCRIBER LINE TERMINAL UNIT AND A STATE TRANSITION CONTROL METHOD

BACKGROUND OF THE INVENTION (1) Field of the Invention

The present invention relates to an optical subscriber line terminal unit and a state transition control method, and more particularly, to an optical subscriber line terminal unit connected to an optical subscriber system for performing optical burst transmission and to a state transition control method for controlling the operation of state transition at the time of startup.

(2) Description of the Related Art

In recent years, communication services are exponentially diversifying and demand for video-on-demand, CATV, high-speed computer communication, etc. is expanding. To provide such bulk communication services at low price, it is essential to use an optical communication system in which a subscriber communication network is constructed using optical devices.

As such optical communication system, PDS (Passive Double Star) has been proposed in which one optical fiber is shared by a plurality of users. Also, PON (Passive Optical Network) system using the PDS technique is attracting attention especially in Europe, and FTTH (Fiber To The Home) system in which an optical fiber is laid up to each home is under development for realization.

To realize such FTTH system, ATM-PON using ATM (Asynchronous Transfer Mode) to reliably provide communication band and quality in response to real-time requests for communications of voice, moving images, etc. is being constructed under the leadership of FSAN (Full Service Access Networks: an international association of communication industries established to promote optical communication business).

Figure 8:
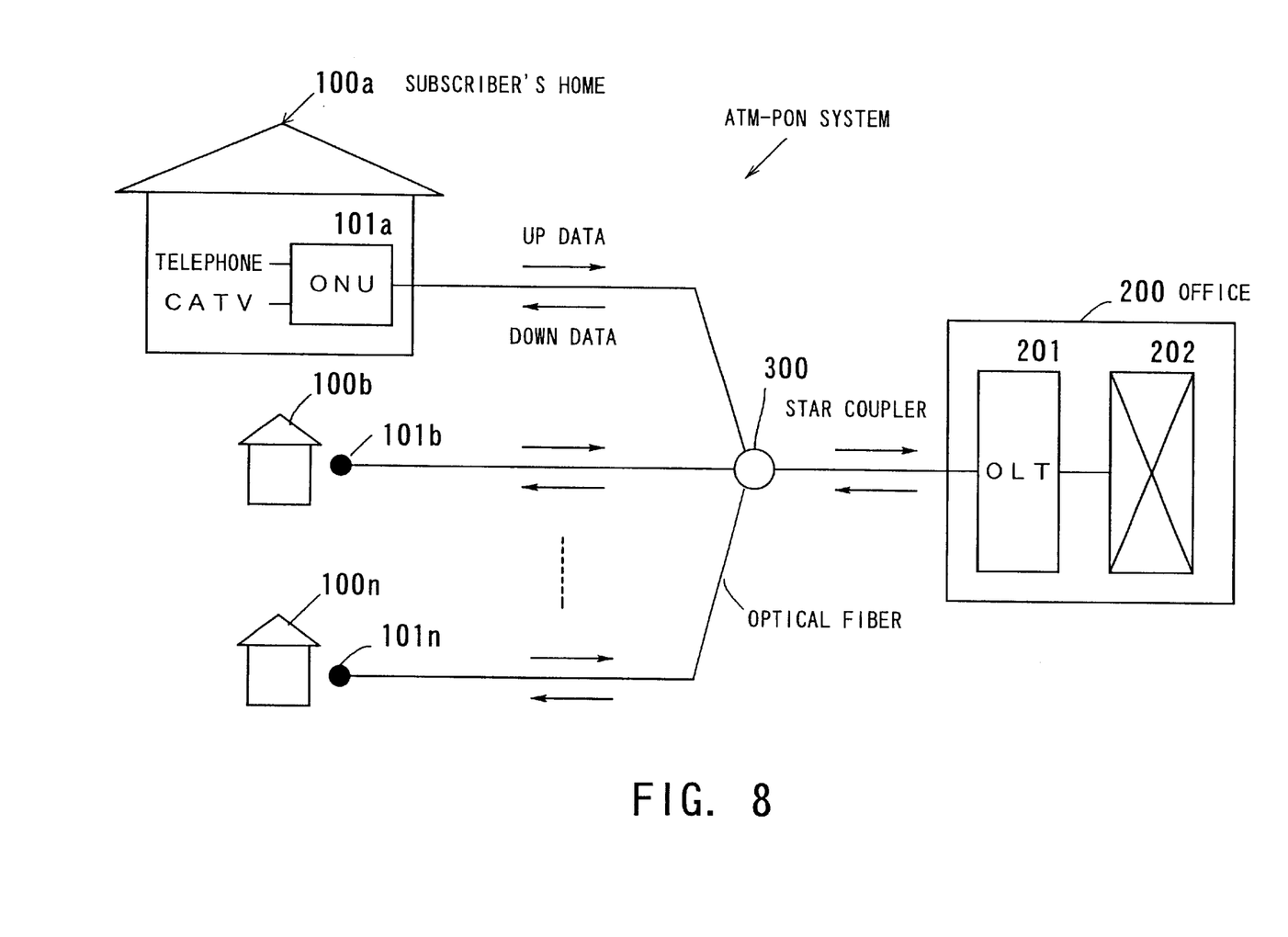
FIG. 8 is a diagram showing an ATM-PON system configuration.

FIG. 8 shows the configuration of an ATM-PON system. ONUs (Optical Network Units: optical subscriber line terminal units) $101a$ to $101n$ for performing optical burst transmission are arranged at respective subscribers' homes $100a$ to $100n$, and an OLT (Optical Line Terminal: optical subscriber line terminal unit) $201$ is arranged in an office $200$.

Telephones, CATVs, etc. are connected to the ONUs $101a$ to $101n$, and an exchange (ATM exchange, ISDN exchange, etc.) $202$ is connected to the OLT $201$. Also, the ONUs $101a$ to $101n$ and the OLT $201$ are connected to a star coupler $300$.

Down data (down cells) directed from the office $200$ to the subscribers' homes $100a$ to $100n$ is transmitted through a single optical fiber, then the star coupler $300$, and a plurality of optical fibers diverging from the star coupler like branches. Up data (up cells) directed from the subscribers' homes $100a$ to $100n$ to the office $200$ is transmitted through the respective branch optical fibers, the star coupler $300$, and the concentrated single optical fiber.

Thus, the ATM-PON system is an optical branch type access network using ATM wherein an office and a plurality of subscribers are connected in the ratio 1:n by the star coupler $300$.

According to the ITU-T recommendation G. 983, on the other hand, state o1 through state o10 are determined as the operation state of ONU, and it is recommended in particular that after the power is turned on, ONU should be in the o1 or o9 state.

The o1 state is an initial state of ONU after the power is turned on. The o9 state is an emergency stop state in which ONU is disconnected from the network and is incapable of communication.

If, for example, a malicious user enters the network using an unregistered ONU, the OLT requests the ONU by its serial number to transmit a password (each ONU is assigned a serial number and a password), and if it is found that there is a discrepancy between the serial number and the password (the OLT is informed in advance of the serial numbers of ONUs and their corresponding passwords), the OLT sends a message to bring the ONU to the o9 state. On receiving the message, the ONU shifts to the o9 state and is brought to an emergency stop.

Once the ONU is brought to the o9 state, it is unable to escape from the o9 state (an o9 state flag is set in the firmware inside the ONU) even if it is switched on again after the power is cut off, unless the ONU is supplied with an o9 state cancellation message from the OLT, thereby making it impossible for a malicious user to use again the ONU.

If the user is thereafter identified as an authorized user by a system administrator and the ONU is registered, the OLT sends an o9 state cancellation message. On receiving the message, the ONU shifts from the o9 state to the o1 state and performs a normal startup operation.

In the ITU-T recommendation G. 983, however, there is no provision as to the sequence process for determining whether the ONU should shift to the o1 state or the o9 state as the operation state after the power is turned on.

Accordingly, when an ONU which has been brought to the o9 state is switched on again after the power is cut off, the ONU may possibly perform an unnatural operation such that it once shifts to the o1 state from a clear state at the start of power supply, and then to the o9 state, thus giving rise to a problem that the startup operation is unstable.

Also, if, during normal operation of the ONU, the o9 state flag is erroneously set for some firmware-related reason, the ONU fails to perform normal operation of state transition, resulting in erroneous operation.

SUMMARY OF THE INVENTION

One object of the present invention is to provide an optical subscriber line terminal unit which is stabilized in operation.

To achieve the above object, there is provided an optical subscriber line terminal unit connected to an optical subscriber system for performing optical burst transmission. The optical subscriber line terminal unit comprises state information storing means for storing state information about the unit, startup preparatory state shifting means for causing a shift to a startup preparatory state at startup, flag setting means for setting an emergency stop state flag during a period of the startup preparatory state if it is judged based on the state information that a state before the startup is an emergency stop state, and state transition control means for causing a shift from the startup preparatory state to the emergency stop state if the emergency stop state flag is set, and causing a shift from the startup preparatory state to an initial state if the emergency stop state flag is not set.

Another object of the present invention is to provide a state transition control method for stabilizing operation.

To achieve the object, there is provided a state transition control method for controlling operation of state transition at startup. The state transition control method comprises storing state information about a terminal unit in a nonvolatile memory, causing a shift to a startup preparatory state at startup, setting an emergency stop state flag during a period of the startup preparatory state if it is judged based on the state information that a state before the startup is an emergency stop state, causing a shift from the startup preparatory state to the emergency stop state if the emergency stop state flag is set, and causing a shift from the startup preparatory state to an initial state if the emergency stop state flag is not set.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
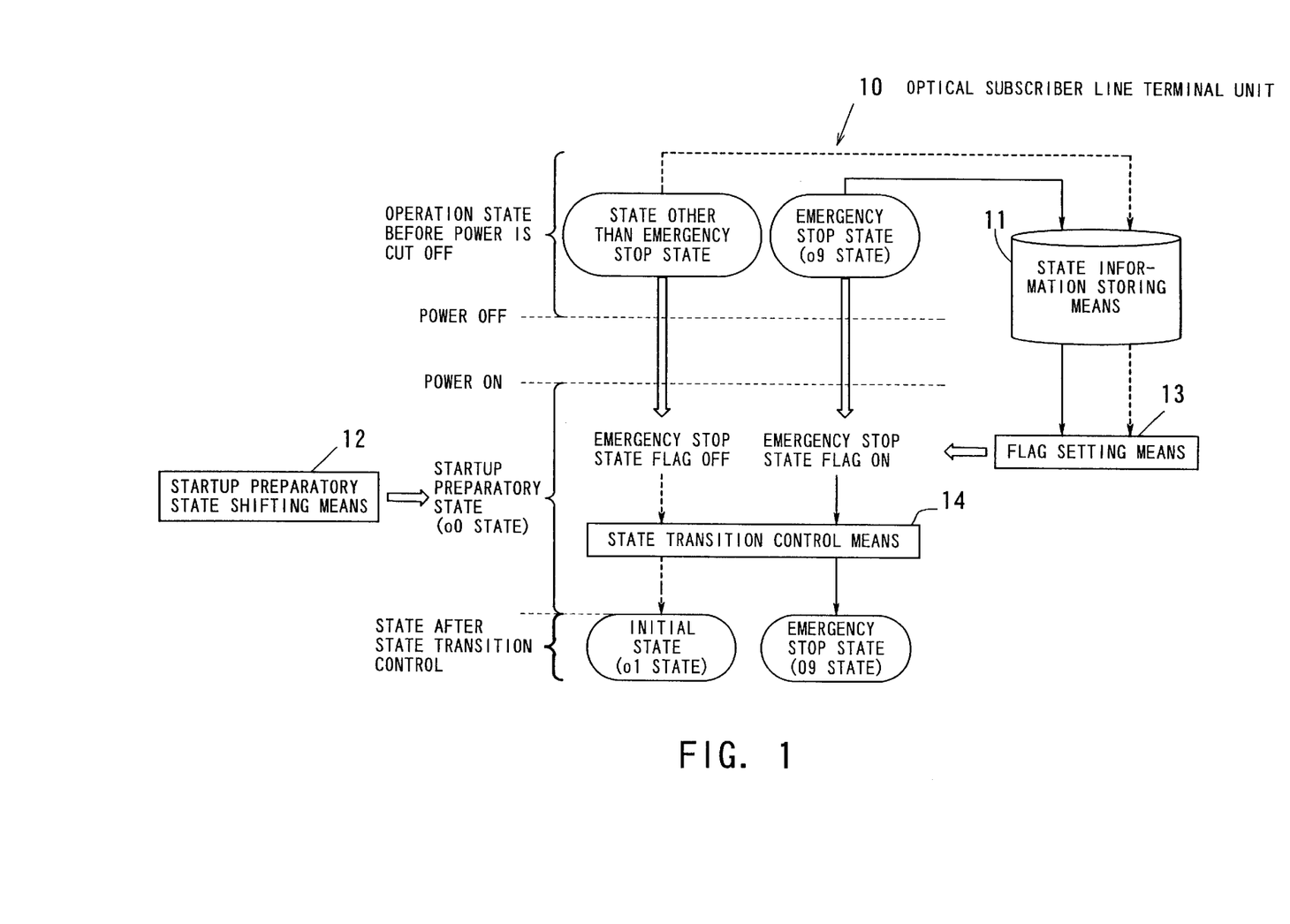
FIG. 1 is a diagram illustrating the principle of an optical subscriber line terminal unit according to the present invention.

Embodiments of the present invention will be hereinafter described with reference to the drawings. FIG. 1 illustrates the principle of an optical subscriber line terminal unit according to the present invention. An optical subscriber line terminal unit 10, which corresponds to the ONU explained with reference to FIG. 8, is connected to an optical subscriber system such as ATM-PON and performs optical burst transmission. In the following, the optical subscriber line terminal unit 10 is referred to as the "ONU 10".

In the figure, the solid arrows indicate the transition from an emergency stop state (hereinafter referred to as the "o9 state") as the operation state before the power is cut off, and the dashed arrows indicate the transition from a state other than the o9 state, as the operation state before the power is cut off.

State information storing means 11 comprises a nonvolatile memory such as a flash memory and stores state information about its own unit (ONU 10). The contents of the state information (hereinafter referred to as "backup information") may be, for example, serial number, password, current operation state, etc.

When the ONU 10 is started with the power turned on, startup preparatory state shifting means 12 shifts the operation state of the ONU 10 to a startup preparatory state (hereinafter referred to as "o0 state").

The o0 state is a state in which determination is made as to whether the ONU 10 is to be shifted to the o1 state or the o9 state as the operation state after the power is turned on, and this state is not prescribed in the ITU-T recommendation G. 983 and is newly provided according to the present invention.

If it is found based on the backup information that the state before the startup (the operation state before the power is cut off) is the o9 state, flag setting means 13 sets (flag ON) an emergency stop state flag (hereinafter referred to as "o9 state flag") during the period of the o0 state. If the state before the startup is not the o9 state, then the flag setting means does not set (flag OFF) the o9 state flag.

When the o9 state flag has been set, state transition control means 14 shifts the ONU 10 from the o0 state to the o9 state, and when the o9 state flag has not been set (flag OFF), the state transition control means shifts the ONU 10 from the o0 state to an initial state (hereinafter referred to as "o1 state").

The state transition control means 14 does not accept, in its state transition control, the o9 state flag that was set during a period other than the o0 state. Namely, the state transition control means does not recognize the o9 state flag which was set ON during normal operation of the ONU 10, and thus does not perform shifting to the o9 state.

Figure 2:
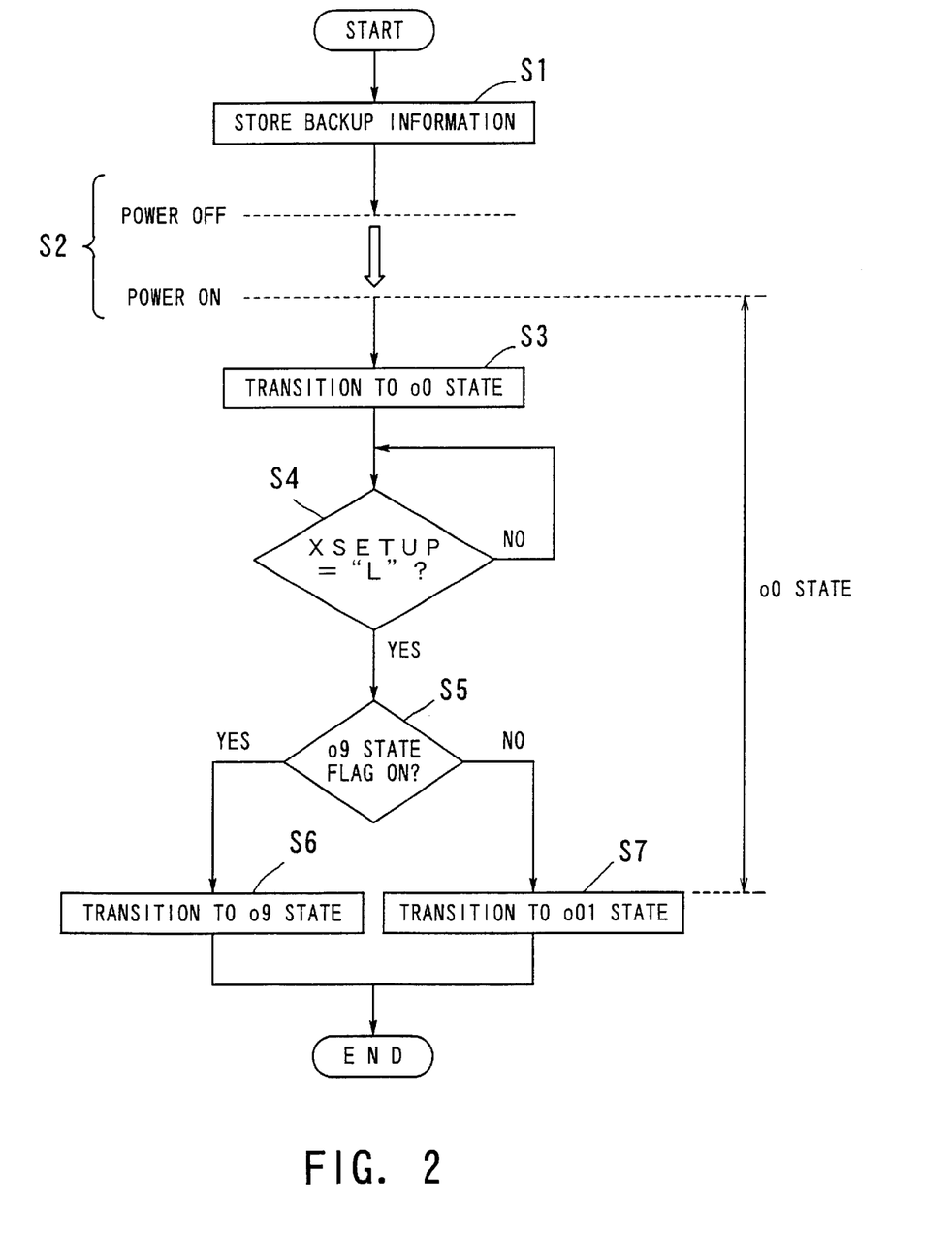
FIG. 2 is an operation flow illustrating an operation procedure of state transition.

The operation will be now described. FIG. 2 is an operation flow illustrating an operation procedure of state transition.

[S1] The state information storing means 11 stores current operation state etc. as the backup information.

[S2] The ONU 10 is once switched off and thereafter the power is turned on again.

[S3] After the power is turned on, the startup preparatory state shifting means 12 causes the ONU 10 to shift to the o0 state.

[S4] The stored backup information is all set in a register. If XSETUP=0, then it means that the setting of the backup information in the register is completed, in which case the flow proceeds to Step S5.

If XSETUP≠0, Step S4 is repeatedly executed until the necessary backup information is set in the register.

[S5] If it is judged based on the backup information that the operation state before the power is cut off is the o9 state, the flag setting means 13 sets the o9 state flag ON and the flow proceeds to Step S6; if not, the o9 state flag is set OFF and the flow proceeds to Step S7.

[S6] The state transition control means 14 causes the ONU 10 to shift from the o0 state to the o9 state.

[S7] The state transition control means 14 causes the ONU 10 to shift from the o0 state to the o1 state.

As described above, the ONU 10 according to the present invention first shifts to the newly provided o0 state at startup, and then shifts to the o9 state if the o9 state flag is set during the period of the o0 state, or to the o1 state if the o9 state flag is not set during the same period.

This makes it possible to smoothly carry out the transition to the o1 state or to the o9 state at the startup of the ONU 10, thus stabilizing the operation and permitting efficient state transition.

Also, the state transition control means 14 does not accept, in its state transition control, the o9 state flag that was set during a period other than the o0 state, whereby erroneous operation can be prevented from being caused during operation of the ONU 10.

Figure 3:
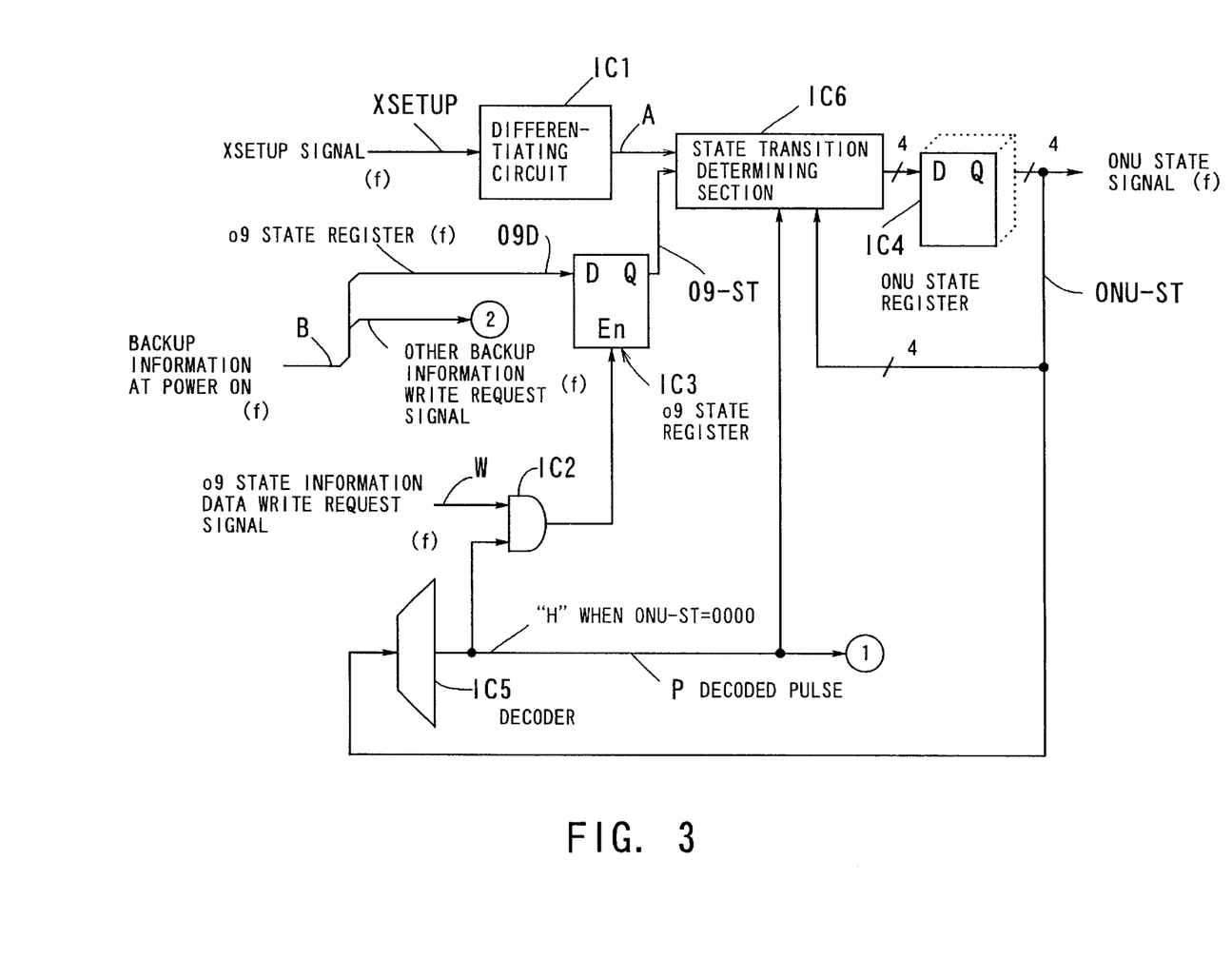
FIG. 3 is a diagram showing an example of arrangement of an ONU.
Figure 4:
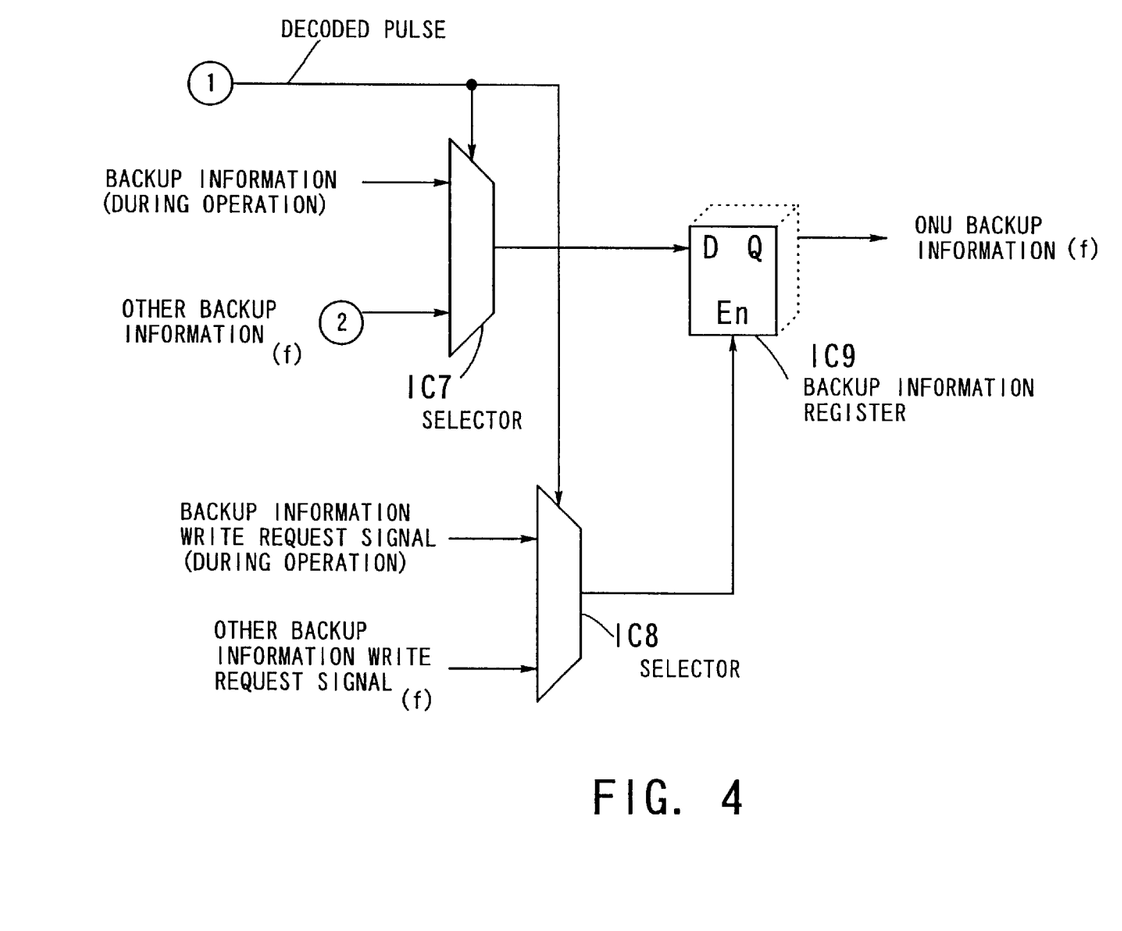
FIG. 4 is a diagram also showing the arrangement the ONU.

The arrangement of the ONU 10 for achieving the state transition according to the present invention will be now described. FIGS. 3 and 4 show an example of the arrangement of the ONU 10. The arrangement shown in the figures is included in an LSI inside the ONU 10. Also, in the figures, (f) represents a signal notified from or to be notified to the firmware. Input and output signals will be explained first.

An XSETUP signal is a signal indicative of whether or not the backup information has been set in a backup information register IC9, and when the setting is completed, "H" turns to "L".

Backup information B derived when the power is turned on is divided into o9 state information data (o9D) and other backup information. The o9 state information data (o9D), which is a signal indicative of whether the state is the o9 state or not, shows "H" if the state is the o9 state, and shows "L" if the state is not the o9 state.

The other backup information indicates all other backup information than the o9 state information data (o9D).

An o9 state information data write request signal (W) is a signal for writing the o9 state information data (o9D) into an o9 state register IC3.

An ONU state signal (ONU-ST) is a signal indicative of a current state of the ONU 10. For example, the ONU state signal shows "0000" if the current state is the o0 state (the Q output of an ONU state register IC4 turns to "L" due to power-on resetting at the time the power is turned on), shows "0001" if the current state is the o1 state, and shows "1001" if the current state is the o9 state. Here "xxxx" denotes 4-bit hexadecimal data.

A decoded pulse (P) is an output signal of a decoder IC5 decoded in such a manner that it turns to "H" when the ONU state signal (ONU-ST) shows the o0 state.

Backup information (during operation) is a signal which is indicative of the contents of backup information during operation of the ONU 10 and which is received from the OLT.

A backup information write request signal (during operation) is a signal for writing the backup information (during operation), and this signal is received from the OLT.

ONU backup information is a signal indicative of backup information latched by the backup information register IC9 and is notified to the firmware.

The firmware writes the received ONU backup information into a flash memory (not shown) when the backup information is to be updated or the power is cut off. When the power is turned on, the firmware reads out the backup information from the flash memory. The information thus read out is the backup information B derived at the time the power is turned on.

The individual components will be now explained. A differentiating circuit IC1 differentiates the trailing edge of the input XSETUP signal and outputs a differential pulse (A).

An AND circuit IC2 obtains and outputs a logical product of the o9 state information data write request signal (W) and the decoded pulse (P).

When the output of the AND circuit IC2 connected to an En terminal of the o9 state register IC3 is "H", the register IC3 outputs an o9 state signal (o9-ST) obtained by latching the o9 state information data (o9D) from its Q terminal in synchronism with rise of an input clock signal.

The ONU state register IC4 latches an output signal from a state transition determining section IC6 and outputs the ONU state signal (ONU-ST).

The decoder IC5 decodes the ONU state signal (ONU-ST) in such a manner that the signal therefrom is "H" when the ONU state signal shows the o0 state.

The state transition determining section IC6 operates based on the logic of the decoded pulse (P) and the differential pulse (A); it verifies the o9 state signal (o9-ST) if the current state is the o0 state, and does not verify the o9 state signal (o9-ST) if the current state is a state other than the o0 state.

Namely, when both the decoded pulse (P) and the differential pulse (A) are "H", it is judged that the current state is the o0 state, and the o9 state signal (o9-ST) is verified.

If, at this time, the o9 state signal (o9-ST) is "H", the state transition determining section IC6 outputs "1001", and if the o9 state signal (o9-ST) is "L", it outputs "0001".

When neither the decoded pulse (P) nor the differential pulse (A) is "H", no verification is made even if the o9 state signal (o9-ST) is "H". In this case, normal operation is under way, and therefore, the state transition determining section IC6 outputs a current state-indicative signal based on the ONU state signal (ONU-ST) fed back thereto (e.g., "0010" is output when the current state is the o2 state).

A selector IC7 selects the other backup information when the decoded pulse (P) is "H", and selects the backup information (during operation) when the decoded pulse (P) is "L".

A selector IC8 selects the other backup information write request signal when the decoded pulse (P) is "H", and selects the backup information write request signal (during operation) when the decoded pulse (P) is "L".

When the output of the selector IC8 connected to an En terminal of the backup information register IC9 is "H", the register IC9 latches the signal output from the selector IC7 and outputs the ONU backup information from its Q terminal in synchronism with rise of the input clock signal.

Figure 5:
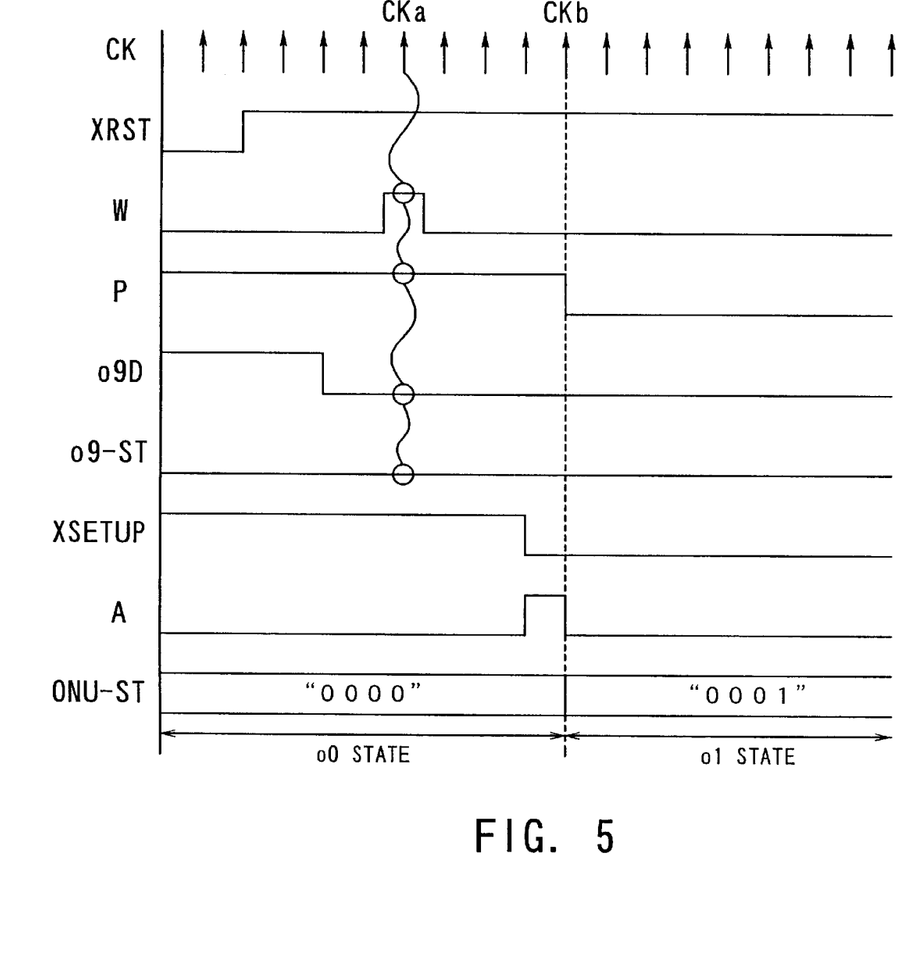
FIG. 5 is a timing chart showing the transition from o0 state to o1 state.

In the following, timing charts of signals derived in the arrangement shown in FIGS. 3 and 4 will be explained. FIG. 5 is a timing chart showing the transition from the o0 state to the o1 state.

"CK" denotes a basic operation clock signal used in the block of the arrangement shown in FIGS. 3 and 4. "XRST" denotes a global reset signal, which turns to "L" at the time of resetting and is thereafter fixed at "H". "W" denotes the o9 state information data write request signal, which is one of the signals input to the AND circuit IC2 and is a one-pulse write request signal. "P" denotes the decoded pulse which is the output signal of the decoder IC5; the pulse turns to "H" in the o0 state and to "L" in the other states.

"o9D" denotes the o9 state information data which is the signal input to the D terminal of the o9 state register IC3, and this signal turns to "H" in the o9 state and to "L" in the other states. "o9-ST" denotes the output signal of the o9 state register IC3.

"XSETUP" denotes the XSETUP signal input to the differentiating circuit IC1 and indicative of whether or not the setting of the backup information is completed. When the setting is completed, the XSETUP signal turns from "H" to "L". "A" denotes the output signal of the differentiating circuit IC1 obtained by trailing-edge differentiation.

"ONU-ST" denotes the ONU state signal, which is the output signal of the ONU state register IC4 and shows "0000" in the o0 state, "0001" in the o1 state, and "1001" in the o9 state.

When the o9 state information data write request signal (W) and the decoded pulse (P) are both "H", the signal applied to the En terminal of the o9 state register IC3 is "H"; therefore, the o9 state information data (o9D) then applied, that is, "L" (indicating that the state at the time of power cutoff is a state other than the o9 state), is latched at CKa and the o9 state signal (o9-ST) "L" is output When the decoded pulse (P) and the differential pulse (A) are both "H", the state transition determining section IC6 recognizes that the current state is the o0 state, and thus verifies the o9 state signal (o9-ST). Since the o9 state signal (o9-ST) is "L", "0001" indicating the o1 state is output from time CKb onward.

Figure 6:
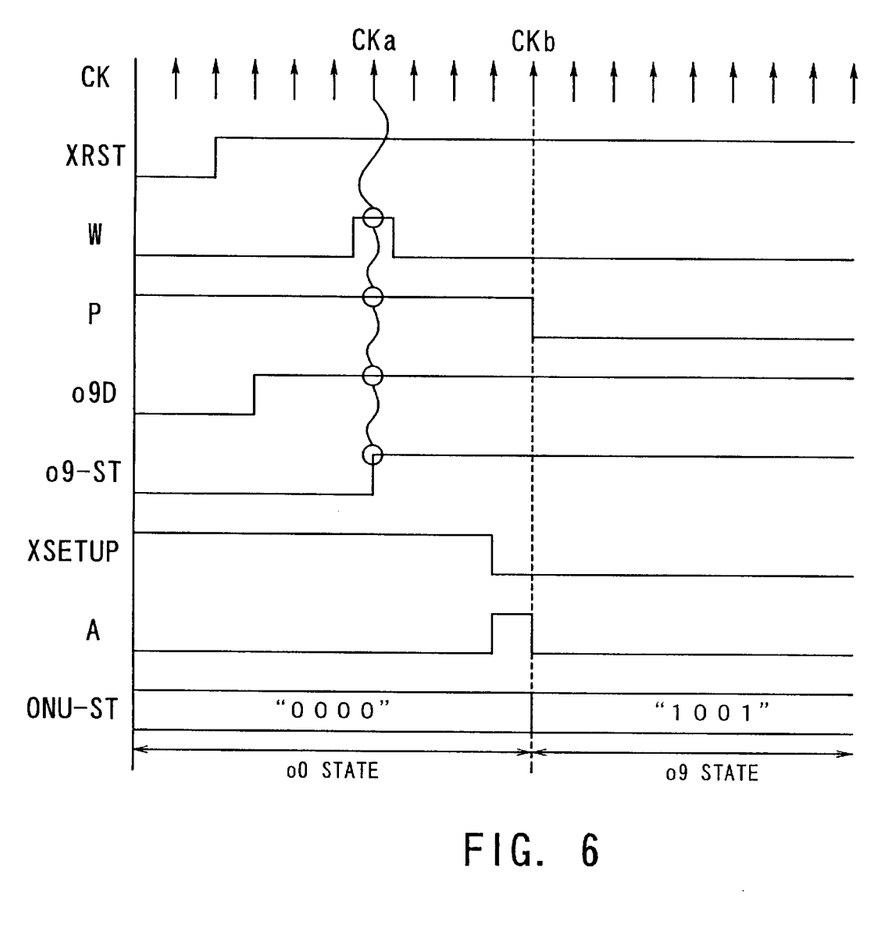
FIG. 6 is a timing chart showing the transition from o0 state to o9 state.

FIG. 6 is a timing chart showing the transition from the o0 state to the o9 state. When the o9 state information data write request signal (W) and the decoded pulse (P) are both "H", the signal applied to the En terminal of the o9 state register IC3 is "H"; accordingly, the o9 state information data (o9D) then applied, that is, "H" (indicating that the state at the time of power cutoff is the o9 state), is latched at CKa and the o9 state signal (o9-ST) "H" is output When the decoded pulse (P) and the differential pulse (A) are both "H", the state transition determining section IC6 recognizes that the current state is the o0 state, and thus verifies the o9 state signal (o9-ST). Since the o9 state signal (o9-ST) is "H", "1001" indicating the o9 state is output from time CKb onward.

Figure 7:
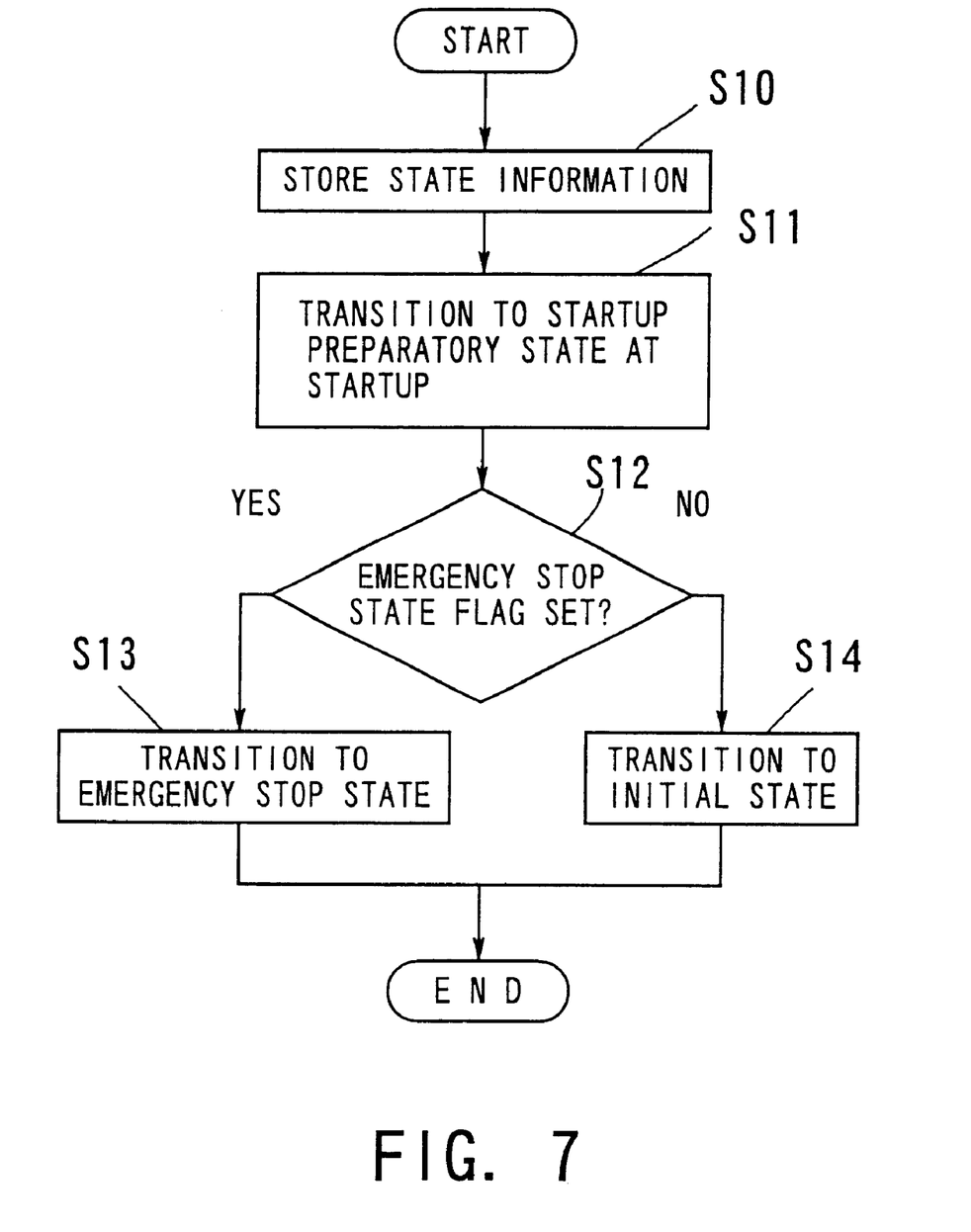
FIG. 7 is a flowchart showing a procedure of a state transition control method according to the present invention.

A state transition control method according to the present invention will be now described. FIG. 7 is a flowchart showing a procedure of the state transition control method.

[S10] State information about the unit is stored in the nonvolatile memory.

[S11] At startup, the state is shifted to the startup preparatory state.

[S12] If it is judged based on the state information that the state before the startup is the emergency stop state, the emergency stop state flag is set and the flow proceeds to Step S13; if not, the flow proceeds to Step S14.

[S13] The state is shifted from the startup preparatory state to the emergency stop state.

[S14] The state is shifted from the startup preparatory state to the initial state.

The emergency stop state flag that was set during a period other than the startup preparatory state is not accepted in the state transition control. Namely, the emergency stop state flag set during normal operation is ignored, so that the state is not shifted to the emergency stop state.

As described above, in the optical subscriber line terminal unit 10 and state transition control method according to the present invention, the state is shifted to the startup preparatory state at startup, and then the state is shifted to the emergency stop state if the emergency stop state flag is set during the period of the startup preparatory state, or to the initial state if the emergency stop state flag is not set during the same period.

This serves to stabilize the startup operation, permitting efficient state transition.

As described above, in the optical subscriber line terminal unit according to the present invention, the state is shifted to the startup preparatory state at startup, and then the state is shifted to the emergency stop state if the emergency stop state flag is set during the period of the startup preparatory state, or to the initial state if the emergency stop state flag is not set during the same period. This serves to stabilize the startup operation, permitting efficient state transition.

In the state transition control method according to the present invention, the state is shifted to the startup preparatory state at startup, and then the state is shifted to the emergency stop state if the emergency stop state flag is set during the period of the startup preparatory state, or to the initial state if the emergency stop state flag is not set during the same period. This serves to stabilize the startup operation, permitting efficient state transition.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical subscriber line terminal unit connected to an optical subscriber system for performing optical burst transmission, comprising:

state information storing means for storing state information about the unit;

startup preparatory state shifting means for causing a shift to a startup preparatory state at startup;

flag setting means for setting an emergency stop state flag during a period of the startup preparatory state if it is judged based on the state information that a state before the startup is an emergency stop state; and state transition control means for causing a shift from the startup preparatory state to the emergency stop state if the emergency stop state flag is set, and causing a shift from the startup preparatory state to an initial state if the emergency stop state flag is not set, the startup preparatory state being distinct from the emergency stop state, the emergency stop state flag having at any time one of only two values of ON when the emergency stop state flag is set and OFF when the emergency stop state flag is not set, the initial state being a single state.

2. The optical subscriber line terminal unit according to claim 1, wherein said state transition control means does not accept, in state transition control thereof, the emergency stop state flag that was set during a period other than the startup preparatory state.

3. A state transition control method for controlling operation of state transition at startup, comprising:

storing state information about a terminal unit in a nonvolatile memory;

causing a shift to a startup preparatory state at startup;

setting an emergency stop state flag during a period of the startup preparatory state if it is judged based on the state information that a state before the startup is an emergency stop state;

causing a shift from the startup preparatory state to the emergency stop state if the emergency stop state flag is set; and causing a shift from the startup preparatory state to an initial state if the emergency stop state flag is not set, the startup preparatory state being distinct from the emergency stop state, the emergency stop state flag having at any time one of only two values of ON when the emergency stop state flag is set and OFF when the emergency stop state flag is not set, the initial state being a single state.

4. The state transition control method according to claim 3, wherein the emergency stop state flag that was set during a period other than the startup preparatory state is not accepted in state transition control.

* * * * *